(12) United States Patent
Ratai

(10) Patent No.: US 8,094,120 B2
(45) Date of Patent: Jan. 10, 2012

(54) SYSTEM AND METHOD FOR OPERATING IN VIRTUAL 3D SPACE AND SYSTEM FOR SELECTING AN OPERATION VIA A VISUALIZING SYSTEM

(75) Inventor: Daniel Ratai, Budapest (HU)

(73) Assignee: 3D For All Szamitastechnikai Fejlezto KFT, Budapest (HU)

( * ) Notice: Subject to any disclaimer, the term of this patent is extended or adjusted under 35 U.S.C. 154(b) by 882 days.

(21) Appl. No.: 11/569,489

(22) PCT Filed: May 24, 2005

(86) PCT No.: PCT/HU2005/000056
§ 371 (c)(1),
(2), (4) Date: Nov. 21, 2006

(87) PCT Pub. No.: WO2005/116809
PCT Pub. Date: Dec. 8, 2005

(65) Prior Publication Data
US 2007/0252832 A1 Nov. 1, 2007

(30) Foreign Application Priority Data

May 24, 2004 (HU) .................................... 0401034

(51) Int. Cl.
*G09G 5/00* (2006.01)

(52) U.S. Cl. ............. 345/156; 345/7; 382/154; 359/462

(58) Field of Classification Search .................. 345/156, 345/7–9; 382/154; 359/462
See application file for complete search history.

(56) References Cited

U.S. PATENT DOCUMENTS

| 5,227,985 A | 7/1993 | DeMenthon |
| 5,986,643 A * | 11/1999 | Harvill et al. .................. 345/156 |

(Continued)

FOREIGN PATENT DOCUMENTS

| EP | 1335317 A2 | 8/2003 |
| JP | 1995 H07-175585 | 7/1995 |
| JP | 2000-102036 | 4/2000 |
| JP | 2000-182058 | 6/2000 |

(Continued)

OTHER PUBLICATIONS

Forms PCT/ISA/210, 220, 237 International Search Report for PCT/HU2005/000056, mailed on Jan. 5, 2006.

(Continued)

*Primary Examiner* — Alexander Eisen
*Assistant Examiner* — Viet Pham
(74) *Attorney, Agent, or Firm* — Wood, Herron & Evans, LLP

(57) ABSTRACT

The system for performing ala operation in a virtual three dimensional space comprises a visualizing system for visualizing the virtual three dimensional space; a 3D position tracking system for marking, in the real three dimensional space, the real space position of the operation to be performed in the virtual three dimensional space; and a means for mapping the position of the real three dimensional space into the virtual three dimensional space and performing the operation in the mapped position. The 3D position tracking system comprises a positioning means provided with at least one signal source; at least two image sensors for detecting the signals emitted by the at least one signal source of the positioning means; and a first means for determining the real space position of the positioning means relative to the image sensors, based oil the signals generated by the image sensors and the spatial location of the image sensors relative to each other.

36 Claims, 3 Drawing Sheets

U.S. PATENT DOCUMENTS

| | | | |
|---|---|---|---|
| 6,037,914 A * | 3/2000 | Robinson | 345/7 |
| 6,456,432 B1 * | 9/2002 | Lazzaro et al. | 359/464 |
| 6,822,643 B2 * | 11/2004 | Matsui et al. | 345/204 |
| 6,975,304 B1 * | 12/2005 | Hawkins et al. | 345/168 |
| 2001/0024512 A1 * | 9/2001 | Yoronka et al. | 382/103 |
| 2004/0008337 A1 * | 1/2004 | Boman | 356/139.03 |
| 2004/0075676 A1 | 4/2004 | Rosenberg et al. | |

OTHER PUBLICATIONS

"Interfaces for Advanced Computing," James D. Foley, Scientific American, Oct. 1987, New York, NY.

* cited by examiner

SYSTEM AND METHOD FOR OPERATING IN VIRTUAL 3D SPACE AND SYSTEM FOR SELECTING AN OPERATION VIA A VISUALIZING SYSTEM

TECHNICAL FIELD

The present invention relates to a system and method for performing operations in a virtual 3D space and a system for selecting, through a visualization system, an operation to be performed.

BACKGROUND

Personal computers currently used wide spread are equipped with a display which provide two dimensional images. However, computers of the future stay before a great challenge in terms of displaying three dimensional images. There already exist computer displays on the market, which are capable of visualizing a virtual three dimensional space. Amongst these there are displays that comprise a screen manufactured by high-end technology, which allow sensing three dimensional images without any auxiliary device, whilst there are much cheaper displays as well, which typically provide the three dimensional view by using special glasses. That purpose of the application of a computer is not only visualizing information but also inputting, and processing information, in relation to computers adapted to display three dimensional images, and a need has been arisen for inputting and processing spatial information, that is for performing operations in the virtual three dimensional space. Although several companies offer computer systems designed for visualizing a virtual three dimensional space, said computer systems being principally available for everyday use at home, 3D technologies applied therein have either very limited capabilities or they are very expensive, and that is why such systems have not used wide spread for the time being. Hereinafter, some of the prior art devices and systems are briefly introduced that are capable of visualizing a virtual three dimensional space and allow performing operations therein.

In the foregoing and the following part of the description, the term "3D space" is used for a well defined segment of the space, that is the term "real 3D space" means a segment of the real space for locating the position of an operation to be performed by moving a positioning device, whereas the term "virtual 3D space" means a segment of a space visualized by a 3D visualizing means.

Document DE 10106850 A1 discloses a position tracking system for 3D computer applications, wherein the position tracking system comprises a spatially movable positioning device, the motion of which is mapped into the virtual three dimensional space. The positioning device is coupled by springs to linear rails arranged orthogonally to each other, said rails representing a spatial coordinate system. The spatial location of the positioning device is detected by a potentiometer system. In this position tracking system, a spatial position is detected by means of a mechanical assembly, which makes actuation of the positioning device more difficult and strongly limits the size of the space segment available for locating the position of an operation.

An even more flexible position tracking system is disclosed in document GB 2388418 A, wherein the position tracking system, the operation of which is based on optical principles, comprises a three dimensional object, for example a cube or a ball, as a positioning device, said object being adapted for moving by hands freely. The image of the object is recorded by a camera. Changes in the spatial position and the orientation of the positioning device are determined from the two dimensional images recorded by the camera. Although use of a second camera is also mentioned in this document, the function of this additional camera is merely limited to obtain supplementary information from eclipsed or awkwardly lit parts of the positioning device. A further disadvantage of this system is that the virtual space is not calibrated to the real-space, therefore the positioning device can be used only for locating relative positions.

A similar solution is introduced in document WO 03/079179 A1, which discloses a positioning device as a spatially movable embodiment of a conventional computer mouse. Such a so called space mouse is provided with a plurality of light sources and a plurality of micro-switches, wherein the light sources may have different colors, sizes or shapes so that the camera can sense displacement or rotation of the space mouse in every spatial direction. Although the above space mouse allows very flexible positioning, its manufacturing cost is rather high.

The purpose of the three dimensional visualization is to provide the capability of sensing spatial shapes as reality by human beings. The spatial effect may be achieved by conveying different images to the left eye and the right eye as the eyes themselves do sense the spatial shapes from different positions. For generating and sensing such a double or stereo image, several technologies have been developed. In the simplest case, the stereo image for the two eyes is displayed on a conventional screen simultaneously and the spatial effect can be sensed by means of special glasses. However, there are sophisticated and very expensive displays as well, which do not need the use of such glasses or any other auxiliary device, since the screen itself provides the stereoscopic view.

One of the simplest and most wide spread solution is based on the separation of two images presented on the same place. In such systems, images for the left and the right eye are displayed on the screen at the same time, and the two images are separated by special 3D glasses in such a way that only the images for the left eye are allowed to pass through the left lens, while only the images for the right eye are allowed to pass through the right lens. Now we introduce some of the systems operating on the basis of image separation.

The core idea of the 3D visualization based on color separation is that two images of different color are generated for the left and the right eye, and the two images of different color are separated by coloured lens. For this purpose, a red lens and a cyan lens are generally used. Through the red lens, only red light can pass, while through the cyan lens, only cyan light can pass. The advantage of a color separation system is its low price, however, one drawback thereof is that it may be harmful for the eyes after a use of 10-15 minutes and another drawback is that it is not available for providing a color three dimensional view.

The core idea of the light polarizing systems is that differently polarized images are generated for the left and the right eye, and the two images of different polarity are separated by polarizing lenses. Unlike the color separation systems, color and entirely realistic images can be reproduced in a light polarizing system. Although manufacturing costs of such polarizing lenses are relatively low, the display device for reproducing the stereo image consisting of images polarized in two directions is very expensive, thus this solution is mostly used in 3D movies.

The systems using so called shutter glasses operate in a manner that respective images for the left and the right eye are displayed alternately, and a pair of shutter glasses do the job of alternately eclipsing one eye after the other, synchronously with the display device. Shutter glasses have lenses adapted to switch between an opaque state and a transparent state at a high frequency. Similar to a light polarizing system, a shuttering system is also available for reproducing color and entirely realistic images. Such a system is advantageous due to its relatively low price and to the fact that unlike a light polarizing system, a conventional computer display is enough to use therein.

A common issue of the above mentioned 3D visualizing systems that they cannot detect and thus cannot follow the position of the eyes, i.e. the view point of the user. Consequently, if one moves away from the optimal position providing the three dimensional effect, the virtual objects will shift in the virtual space and they will appear with more or less distortion, which will lead to a degradation of the realistic impression of the three dimensional image. This problem may be avoided by using a head mounted display (HMD).

A HMD display is a special pair of glasses which comprises two displays of reduced size in place of the lenses, said displays directly reproducing the respective images for the two eyes. HMD displays are provided with magnetic and gravitational sensors for sensing any motion of the head, therefore they reproduce undistorted images even if the user is moving and in addition, they are adapted to work even with a 360 degree turn-around of the user. Disadvantages of the HMD displays include their high price due to the special sensors and their limited capability of displaying only a narrow angle of sight of approximately 30-40 degrees.

Systems for performing operations in the virtual three dimensional space are addressed to allow various activities in the virtual space for the user so that operations are performed at locations in the virtual space corresponding to locations selected in the real space and in addition, the operations or the result of the operations can be sensed as reality with three dimensional effect. A common purpose of such systems is to allow performing operations within the virtual tree dimensional space, in addition to visualizing it.

One of the most known virtual 3D manipulation systems currently on the market is the Reachin Core from Reachin Technologies AB, which comprises a special application level programming interface and an integrated 3D position tracking and 3D visualizing system. For the spatial operations, the Rachin Core uses a three dimensional marker developed by SensAble Inc., the position of which is tracked by the computer by means of a mechanical system. The marker is fixed to the end of mechanic arms, and the position of the marker is determined from the inclination angles of the hinge joints of the arms. There is also provided a push button on the marker, the function of which is similar to that of a mouse button. One of the advantages of this kind of marker is that any operation can be freely performed with it in three dimensions in the same manner as with a conventional computer mouse in two dimensions. Furthermore, the marker is provided with a force-feedback mechanism, thus virtual objects become tangible in fact. Such a virtual 3D manipulation system allows to bring the place of the real spatial operation and the place of its virtual three dimensional appearance into coincidence. The three dimensional image can be sensed by using a pair of shutter glasses and a mirror, wherein the three dimensional image appears behind the mirror. The marker is also used behind the mirror, thus the place of the activity and the place of the reproduced image is the same. A drawback of this system is that the real space and the virtual space is not perfectly coincident, since the position of the shutter glasses is not being tracked and therefore the reproduced image cannot be properly oriented with respect to the position of the eyes, i.e. to the view point of the user. The same problem arises in all the other virtual 3D manipulating systems existing currently on the market.

SUMMARY OF THE INVENTION

An objective of the present invention is to provide a system for performing operations in the virtual 3D space, wherein the location of the operation is selected in the real 3D space and the virtual 3D space is visualized undistorted with an orientation corresponding to the instantaneous point of view of the user.

Another objective of the present invention is to provide a virtual 3D manipulation system which is substantially cheaper than any of the similar prior art solutions and which allows to use a space segment of arbitrary size for position tracking, and wherein the real three dimensional space segment for position tracking and the visualized three dimensional space segment is perfectly coincident.

Another objective of the present invention is to provide a method for operating the above system.

Finally, another objective of the present invention is to provide a system for selecting, through a visualizing system, an operation to be performed, wherein the principle of position tracking is used in the selection process.

These and other objectives are achieved in the present invention by a system for performing an operation in the virtual three dimensional space, wherein the system comprises a visualizing system for visualizing the virtual three dimensional space; a 3D position tracking system for marking, in the real tree dimensional space, the real space position of the operation to be performed in the virtual three dimensional space; and a means for mapping the position of the real three dimensional space into the virtual three dimensional space and performing the operation in the mapped position. The 3D position tracking system comprises a positioning means provided with at least one signal source; at least two image sensors for detecting the signals emitted by the at least one signal source of the positioning means; and a first means for determining the real space position of the positioning means relative to the image sensors, based on the signals generated by the image sensors and the spatial location of the image sensors relative to each other.

In the system according to the invention, the visualizing system for visualizing the virtual three dimensional space preferably comprises a means for reproducing three dimensional images; at least two signal sources arranged in a fixed location relative to the user's eyes; at least two image sensors for detecting the signals emitted by the signal sources; a second means for determining the real space positions of the user's eyes based on the signals generated by the image sensors; and a third means for determining the viewing point of the virtual three dimensional space based on the positions provided by the second means and generating a corresponding image for each eye.

The above objectives are further achieved in the present invention by a method for performing an operation in a virtual three dimensional space, wherein the method comprises the steps of visualizing a virtual three dimensional space; marking, by positioning in the real three dimensional space, the position of the operation to be performed in the virtual three dimensional space; mapping the position of the real three dimensional space into a position of the virtual three dimensional space; and performing the operation in the virtual three dimensional space at the mapped position. The step of positioning in the real three dimensional space comprises the steps of moving at least one signal source fixed to a positioning means into a selected position of the real three dimensional space; detecting the signals emitted by the at least one signal source being in the selected position by using at least two image sensors; and determining the real space position of the positioning means relative to the image sensors, based on the signals generated by the image sensors and the spatial location of the image sensors relative to each other.

The positioning means is preferably formed as a stick with the at least one signal source arranged at its one end. The stick may comprise a button for marking the position.

Preferably, the at least one signal source of the positioning means is a light source emitting visible or infrared light. The intensity of the light sources is preferably adjustable.

The image sensors are preferably cameras recording 2D images, wherein the cameras may be provided with a light proof unit for preventing incidence of the environmental diffuse light.

The first means may be adapted to determine both the real space position and the real space orientation of the positioning means relative to the image sensors.

It is particularly beneficial when the real space position of the operation and the virtual space position of the operation is coincident.

The means for reproducing three dimensional images preferably comprises a display reproducing different images for the left eye and the right eye of the user and a corresponding pair of glasses for image separation. The signal sources are preferably fixed to said pair of glasses. The glasses may include glasses separating the different colors of the screen, glasses separating the differently polarized images of the screen, and so called shutter glasses.

In case three signal sources are fixed to the glasses of the three dimensional visualizing system, the overall system may further comprise a fourth means for mapping the displacement of the third signal source of said pair of glasses relative to the display into an operational instruction, said displacement being detected by the image sensors. The operational instruction is preferably a motion to be performed in the virtual three dimensional space.

In the virtual 3D manipulation system, the same image sensors are used in the 3D position tracking system and in the system for visualizing the virtual three dimensional space.

The positioning means, as well as the glasses may comprise a vibrator unit that is put into operation by a sixth means when the positioning means gets into a predetermined position.

Finally, the above objectives are further achieved by a system for selecting, through a visualizing system, an operation to be performed, wherein the system comprises a position tracking system and a visualizing system for visualizing images having activable fields, said activable fields being associated with predetermined functions. The position tracking system comprises a positioning means provided with at least one signal source; at least two image sensors for detecting the signal emitted by the at least one signal source of the positioning means; and a first means for determining the real space position of the positioning means relative to the image sensors, based on the signals generated by the image sensors and the spatial location of the image sensors relative to each other. The selection system further comprises a fifth means for activating a field in the image visualized by the visualizing system, said field being associated with the marked position.

The visualizing system may be adapted for visualizing two or three dimensional images. The image may contain point-like, two dimensional and, in case of 3D images, three dimensional activable fields.

The visualizing system may be arranged remotely with respect to the positioning means and the image sensors.

BRIEF DESCRIPTION OF THE DRAWINGS

Further objectives and advantages of the present invention will be described in more detail by means of preferred embodiments with reference to the accompanying drawings, wherein.

DETAILED DESCRIPTION

Figure 1:
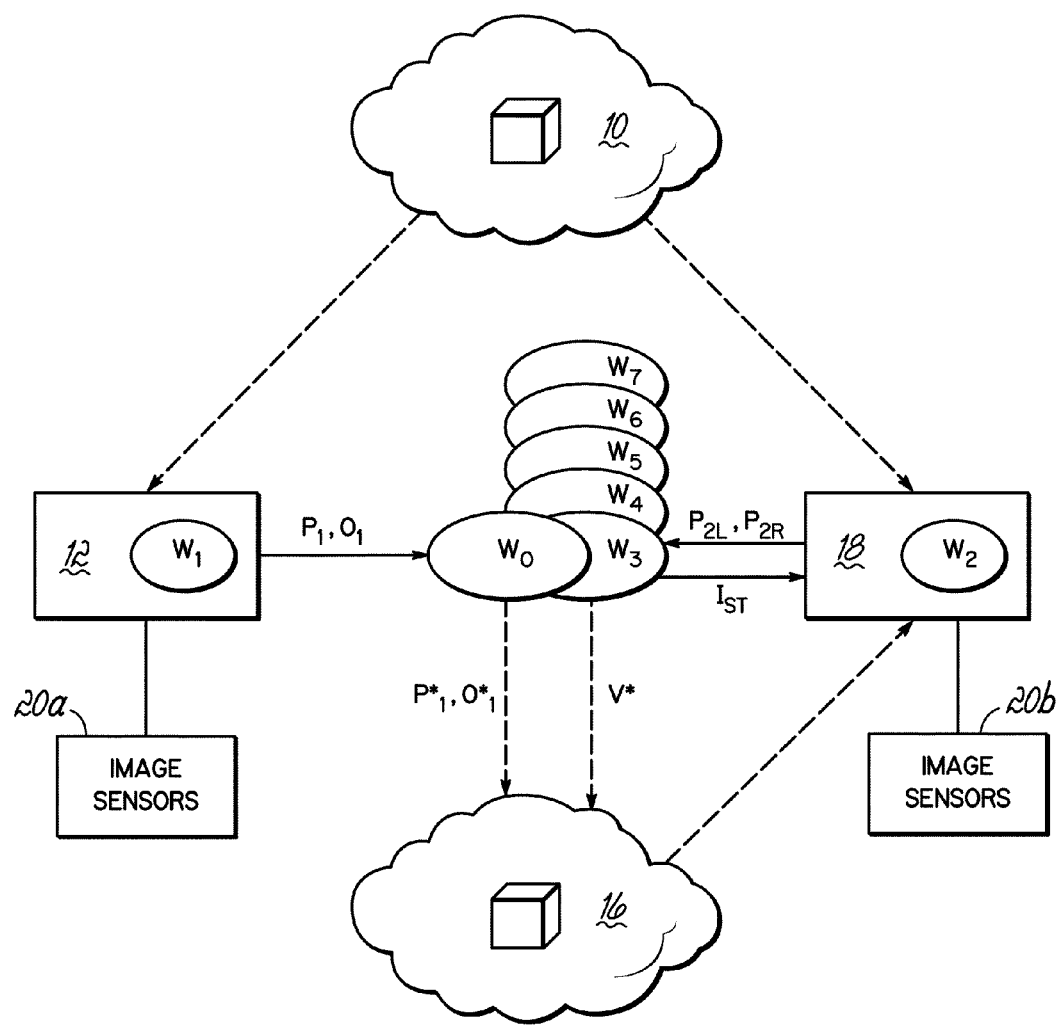
FIG. 1 is a functional block diagram of the virtual 3D manipulation system according to the present invention.

The functional block diagram of the virtual 3D manipulating system according to the invention is illustrated in FIG. 1. Location of the operation to be performed in the virtual space is marked in the real three dimensional space 10 by a positioning device 135. Position of the positioning device 135 is monitored by a position tracking system 12 and upon a corresponding instruction, the real space position $P_1$, i.e. spatial location and, if necessary, the real space orientation $O_1$ of the positioning device 135 is recorded by the position tracking system 12. The real space position and orientation of the positioning device 135 may be represented by co-ordinates of an arbitrary co-ordinate system like an orthogonal co-ordinate system or a polar co-ordinate system. Under position of the positioning device 135 we always mean a preferential point of the positioning device 135, which is typically one of its end points, and under orientation of the positioning device 135, we always mean a spatial direction determined by at least three preferential points of the positioning device 135. In case the location of performing an operation is not point-like, motion of the positioning device 135 in the real space 10 may be continuously tracked and recorded by the position tracking system 12, thus a spatial section or track may be assigned to the operation to be performed, wherein position information and, if necessary, orientation information is associated with each point of said section or track. The operational track may be represented either by a continuous section or by a section of discrete points. For the sake of completeness, we suppose in the following part of the description, that in addition to the position information, the orientation information is also recorded. The position tracking system 12 computes real space position $P_1$ and orientation $O_1$ of the positioning device 135 by a processing device $W_1$, based on the signals emitted by signal sources fixed to the positioning device 135 and detected by image sensors.

The position $P_1$ and the orientation $O_1$ of the positioning device 135 are forwarded by the position tracking system 12 to a processing device $W_0$, which maps the position $P_1$ and the real space orientation $O_1$ of the real space 10 into a position $P^*_1$ and an orientation $O^*_1$ of the virtual three dimensional space 16. If the real space 10 and the virtual space 16 are coincident, i.e. the virtual space 16 is calibrated to the real space 10, the position $P_1$ will be identical to the position $P^*_1$, whereas the orientation $O_1$ will be identical to the orientation $O^*_1$, thus one can work in the virtual space 16 in the same way as would do it in the real space 10.

In the virtual 3D manipulating system according to the invention, the virtual space 16 is visualized in an undistorted and realistic manner by a three dimensional visualization system 18 that continuously tracks positions $P_{2L}$ and $P_{2R}$ of the user's eyes in the real three dimensional space in such a way that it determines the positions $P_{2L}$ and $P_{2R}$ of the eyes in the real three dimensional space by using a processing device $W_2$, based on signals emitted by signal sources fixed to the head of the user and detected by image sensors, and then these computed values are forwarded to a processing device $W_3$. The position tracking system 12 may receive detected signals from a first set of image sensors 20a, and the three dimensional visualization system 18 may receive detected signals from a second set of image sensors 20b, although it will be understood that the first and second sets of image sensors 20a, 20b may alternatively be the same in some embodiments. According to the positions $P_{2L}$ and $P_{2R}$ of the eyes, the processing device $W_3$ determines the instantaneous viewing point $V^*$ of the virtual space 16 and generates a stereo image $I_{ST}$ of the virtual space 16. The stereo image $I_{ST}$ consists of two different images, each of them showing the objects of the virtual three dimensional space 16 as they can be seen from the respective positions $P_{2L}$ and $P_{2R}$ of the two eyes. This stereo image $I_{ST}$ is reproduced by the visualizing system 18. If positions $P_{2L}$ and $P_{2R}$ of the eyes change, the viewing point $V^*$ of the virtual space 16 will be adjusted by the processing device $W_3$ in such a way that the image $I_{ST}$ reproduced by the visualizing system 18 will always provide a realistic and undistorted three dimensional effect. If the viewer moves, for example, rightwards, he can see the objects in the virtual space 16 from right, whereas if he moves, for example, upwards, he can see the objects in the virtual space 16 from above.

Since the positions $P_{2L}$ and $P_{2R}$ of the eyes relative to each other may vary in case of different users due to their different anatomical properties, the system according to the present invention preferably allows to adjust the value utilized by the system for the distance between the two eyes. Thus the virtual three dimensional space and the real three dimensional space can be made perfectly coincident for every user.

As shown in FIG. 1, the virtual 3D manipulation system may comprise a processing device $W_1$ that is used to provide other optional functions introduced later on. In the foregoing and the following part of the description, processing device $W_1$ stands for a sequence of operations executed by a processing unit, which is typically a computer program executed by a processor. However, the processing device $W_1$ also involves implicitly a hardware device for execution of the sequence of operations, for example a processor unit in which the computer program runs. It should be noted that a certain processing device $W_1$ of the system may be associated with the same processing unit.

The core idea of the virtual 3D manipulation system according to the invention is that the determination of the location of points in the three dimensional space is based on the theory of three dimensional reconstruction of the space from stereo images. It means that both of the spatial location of the operation and the viewing point of the are marked by using one or more signal source, and the signals emitted by the signal sources are detected by at least two image sensors arranged at different places. Spatial location of the signal sources are determined by processing the detected signals. By applying more than two image sensors for determining the spatial location of each signal source, reliability of the overall system may be enhanced because enough spatial information can be obtained on the signal sources getting into eclipse during use of the system, thus achieving precise positioning. It is obvious for those skilled in the art how the three dimensional space reconstruction based on one stereo image can be extended to a three dimensional positioning based on a plurality of stereo images with using more than two image sensors.

Accordingly, the virtual 3D manipulation system according to the invention comprises a 3D position tracking system for marking, in the real three dimensional space, the location of an operation to be performed in the virtual three dimensional space, a device for mapping the position selected in the real three dimensional space into the virtual space and performing the operation in the virtual three dimensional space, and a visualizing system for visualizing the virtual 3D space. The 3D position tracking system comprises a positioning device 135 provided with at least one signal source, a plurality of image sensors for detecting the signals emitted by the at least one signal source of the positioning device 135, and a processing device for determining the real space location of the positioning device 135 relative to the image sensors based on the signals generated by the image sensors and the position of the image sensors relative to each other. Spatial location of the positioning device is determined by the signals provided by the image sensors, based on the theory of three dimensional reconstruction of the space from stereo images. The type of the operation to be perfoiuied may be specified (selected) in any way, for example by selecting from a menu, activating an activable field on the screen, activating an activable field or space segment visualized in the virtual 3D space, using the keyboard, instructing by voice, etc. Selection of the operation may be carried out before or after positioning the operation. In a preferred embodiment of the system according to the invention, the type of the operation is first selected by moving the positioning device 135 into a certain location, and only afterwards the position of the operation is marked. In another preferred embodiment of the system according to the invention, the type of the operation is specified by moving the positioning device 135 in a predetermined way. In the latter case, the positioning device 135 is fixed in the virtual space to the object subjected to an operation and the virtual object is manipulated by suitably moving, for example drawing, rotating, etc., the positioning device 135.

In the virtual 3D manipulation system according to the invention, light sources are preferably used as signal sources and cameras recording two dimensional images are preferably used as image sensors. In order to reduce implementation costs, the same cameras are used in the position tracking system and in the 3D visualizing system. However, it is obvious for those skilled in the art that the position tracking system and the 3D visualizing system may utilize their own cameras (as schematically shown by reference numbers 20a and 20b in FIG. 1), and instead of light sources and 2D cameras, any other kind of signal sorces and corresponding sensors may be utilized which are capable of determining the exact location of spatial points. Consequently, the signals are not limited to light signals, for example visible or infrared light signals, but may include radio frequency signals, microwave signals, ultrasonic signals, etc., although generation and detection of such signals require much more expensive devices than that of the of light sisnals.

In case a plurality of positioning devices 135 are used at the same time, signal sources with different characteristics, for example light sources with different colors, are preferably used in the positioning devices 135. Reliability of the position tracking may be substantially improved if more than two image sensors (e.g. cameras) are used, since in such a configuration, one or more signal source hidden from one of the image sensors due to an eclipsed state may be detected by all the other image sensors that can obtain enough spatial information on the one or more eclipsed signal source to achieve precise positioning.

Figure 2:
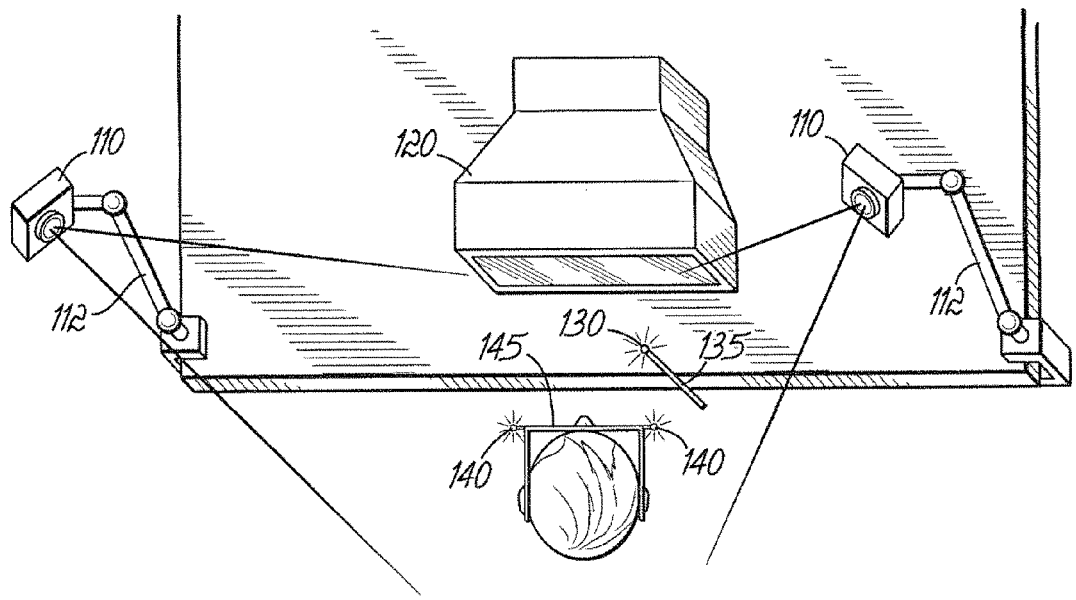
FIG. 2 is a plan view of the arrangement of the system according to an embodiment of the present invention.

A preferred and low-cost embodiment of the virtual 3D manipulating system 100 according to the invention is illustrated in FIG. 2, which shows a schematic plan view of the system configuration. The system 100 comprises two 2D cameras 110, a display 120, a positioning device 135 equipped with a light source 130, a pair of glasses 145 equipped with light sources 140 and a processor (not shown) used for tracking the position of the positioning device 135, for tracking the position of the viewing point as a feed-back information in the 3D visualizing system and in general, for running all computer programs necessary for the virtual 3D manipulation. In the system 100 according to the embodiment shown in FIG. 1, the same cameras 110 are utilized for tracking position of the operation and for tracking the user's viewing point. Cameras 110 are arranged so that they are outside each other's field of view. In this case the cameras 110 are above the display 120 and they face transversely downwards, towards the user (effective) space segment. As shown separately in FIG. 3A, the positioning device 135 is preferably designed as a stick with a light source 130 arranged at its one end. The stick also has a push button 132 having a control function. The user works with the positioning means device 135 just before himself, in the space segment between his glasses 145 and the display 120. Each camera 110 is preferably mounted on a skeleton 112 comprising joints and being adapted to translate and rotate in different directions. Due to this construction, the cameras 110 can be always fixed on an optimal location. The cameras 110 are preferably arranged so that the plain of the screen of the display 120, the two light sources 140 mounted on the glasses 145 and the light source 130 mounted on the positioning device 135 fall into the field of view 114 thereof. Although not shown in the drawings, the system 100 also comprises switches and brightness controlling units (to adjust optimal brightness) for the light sources 130, 140, as well as adapters for powering them from the mains.

A particularly preferred embodiment of the virtual 3D manipulation system according to the invention (not shown) comprises four wide-aperture cameras arranged at four corners of the display, with preferably integrated into the frame of the screen.

In the system 100 shown in FIG. 2, the position of the light sources are determined based on the different pieces of image information provided by the two cameras 110, which are properly placed and calibrated by a processing device $W_1$ shown in FIG. 1. During this process, the field of view 114 captured by the cameras 110 are represented in a three dimensional orthogonal co-ordinate system, thus assigning three space co-ordinates to each point of the real three dimensional space. As mentioned before, in addition to the location or position, a direction vector (orientation information) or any other information (e.g. a phenomenon, a motion, etc.) sensible for the cameras 110 may also be assigned to each point of the real three dimensional space. Since only the light signals of the light sources 130, 140 are desired to be detected, while other light signals of the environment, in particular the scattered light, cause interferences, it is preferred to place a light-proof unit in front of the objective of each camera 110 for filtering out such interferences. The light-proof unit may include a dark glass, a darkened foil or even a complicated opto-electronic device or any other device adapted for passing the light signals of the light sources 130, 140, while filtering out any other light signals that may exist under natural circumstances. Alternatively, the cameras 110 may have a default adjustment to sense only the light signals of the light sources 130, 140. In this case, the processing device $W_1$ receives information only on the location of the light sources 130, 140 from the different viewing points of the cameras 110. Due to the use of the light-proof units, the images recorded by the cameras 110 contain white points for the light sources, while the background is black. As the light emitted by the light sources 130, 140 diffuses to some extent, contours of the light sources 130, 140 are a bit blurred in the images recorded by the cameras 110, which allows for the processing program, based on the different brightness levels of the contour pixels, to determine the location of the light sources 130, 140 with greater accuracy than the actual resolution of the cameras 110. In this way, cameras 110 with a resolution of even 160×120 pixels are practically adequate to determine a position with an acceptable accuracy.

In an alternative embodiment of the system according to the invention, the positioning device 135 comprises a vibrator unit that vibrates the positioning device 135 held by the user in his hand when a certain position is marked. In this embodiment, the system also comprises a processing device $W_6$ (shown in FIG. 1) that monitors motion of the positioning device 135 and when the positioning device 135 gets into a predetermined position, it puts the vibrator unit of the positioning device 135 into operation. Similarly to the positioning device 135, the glasses used for the 3D visualization may also be equipped with such a vibrator unit, the operation of which is controlled by a processing device $W_7$ (shown in FIG. 1) in the same way as mentioned before. The vibratory positioning device 135 is particularly advantageous for blind and partially sighted people, since such a positioning device 135 makes objects of the virtual space sensible for them. The vibratory glasses, however, may be useful in virtual games, for example.

In order to make the virtual three dimensional space visualized by the 3D visualizing system exactly coincident with the real three dimensional space used for locating the operation, one has to calibrate the 3D visualizing system. The calibration procedure is carried out in the following way. First, the cameras 110 are adjusted so that the screen of display 120 falls into their field of view 114. Next, the light sources 140 of the glasses 145 are switched off, and only one of the light sources 130 of the positioning device 135, preferably that one arranged at the tip of the stick, is powered. In the following step, a plurality of reference points, for example the corners of the display 120, are marked one after the other in a predetermined sequence by using the positioning device 135. A calibrating computer program is then run to determine the state (position and orientation) of the cameras 110 relative to the reference points. After the calibration procedure, all of the light sources 130, 140 are powered and, based on the two images recorded by the two cameras 110 and the location of the cameras 110 relative to each other and to the display 120, the processing device $W_1$ and $W_2$ (shown in FIG. 1) compute spatial location of the light sources 130, 140 in order to determine the position of the positioning device 135 and the glasses 145 in the real three dimensional space. Calibrated values associated with the reference points are preferably stored in a non-volatile memory, thus the calibration procedure is to be repeated only if the position and/or the orientation of the cameras 110 or the display 120 changed for some reason.

In a preferred embodiment of the virtual 3D manipulation system according to the invention, the calibration procedure further comprises the steps of recording spatial arrangement of any other light sources, in particular the illuminating light sources, within the field of view of the cameras 110, and reproducing the objects in the virtual three dimensional space according to the real illumination conditions, thus further enhancing the realistic effect.

Figures 3A, 3B:
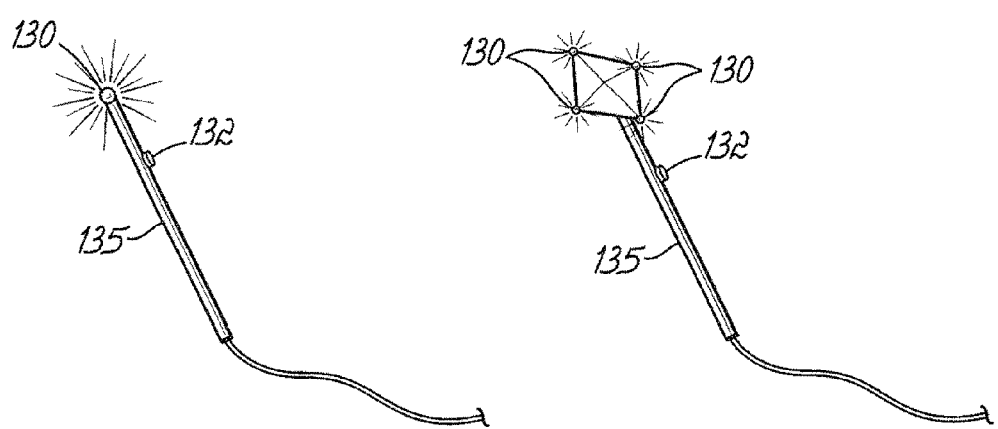
FIGS. 3A and 3B illustrate various positioning means of the system in the form of sticks, according to different embodiments of the present invention.

By mounting more than one light source on a device, like in the case of the glasses 145, the orientation of that device may also be determined. Accordingly, in an alternative embodiment of the system 100 according to the invention as shown in FIG. 3B, the positioning device 135 is used in the form of a stick with a plurality of light sources 130 arranged at one end thereof. Preferably, four light sources 135 are used, which are arranged at the four peaks of an imaginary tetrahedron. By using a positioning device 135 like this, not only the spatial position, but also the orientation of the operation to be performed may be marked depending on the type of the operation. For example, if a cube is to be rotated in the virtual three dimensional space by moving one of its corners, after selecting the corner, direction of the rotation may be set by aligning the stick used as positioning device 135 into the desired direction.

The display 120 of system 100 is a visualizing device reproducing two different images, i.e. a stereo image, for the two eyes on its screen. For sensing the spatial effect, special glasses 145 for image separation are necessary, the type of which is basically defined by the method of image generation. In case the screen displays two images of different color for the two eyes simultaneously, a pair of glasses 145 separating the different colors of the screen for the left eye and the right eye is to be used. However, if the screen displays two images of different polarity for the two eyes simultaneously, a pair of glasses 145 separating the differently polarized images of the screen for the left eye and the right eye is to be used. Furthermore, the display may reproduce the images alternately for the left eye and the right eye at a predetermined frequency, in which case a pair of glasses 145 alternately shutters one eye after the other, synchronously with the alternation of the images. (These are the so called shutter glasses.)

Figure 4A:
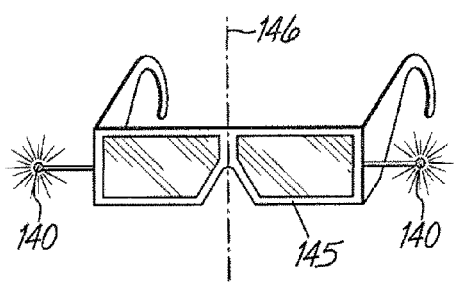
FIGS. 4A and 4B illustrate various 3D glasses used in the system according to different embodiments of the present invention.

When any one of the glasses 145 mentioned above is used for 3D visualization, the two light sources 140 are preferably mounted on the glasses 145 so that they are at the same distance from a central axis 146 of the glasses 145 as shown in FIG. 4A. In this case, positions of the eyes are determined based on the positions of the light sources 140 in the real three dimensional space. For computing the exact location of the viewing point of the virtual space, it is preferred that the two light sources 140 are fixed to the glasses 145 in such a way that they lie on an imaginary straight line connecting the two eyes (more precisely, the two pupils). As shown in FIG. 4A, the light sources 140 of the glasses 145 are mounted on protruding bearing members in order to avoid getting into an eclipsed state with respect to one of the cameras 110 when the user turns his head a little.

Figure 4B:
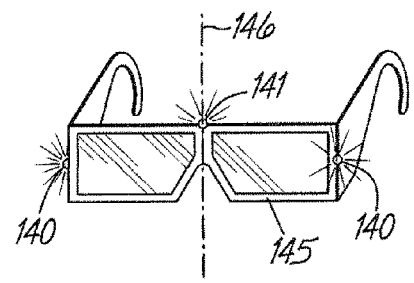

As shown in FIG. 4B, a third light source 141 may be mounted on the glasses 145 along the central axis 146 of the glasses 145. Application of the third light source 141 allows to detect, by the image sensors (e.g. by the cameras 110), rotation of the glasses 145 around an axis defined by the two light sources 140, and such rotational motion may be interpreted as an instruction by a processing device $W_4$ (shown in FIG. 1). For example, if one tilts his head afore, that is one moves the light source 141 while keeping the other two light sources 140 in place, this movement may be interpreted as a kind of motion to be performed in the virtual three dimensional space. Such a motion may be, for example, going ahead or turning downwards. In case the movement of the light source 141 represents a kind of motion in the virtual three dimensional space, the processing device $W_4$ sends an instruction to the processing device $W_3$ to change the image to be displayed on the screen according to that kind of motion, thus allowing navigation in the virtual three dimensional space. As shown in FIG. 4B, when applying three light sources 140, 141, the marginal light sources 140 are not necessary to arrange for a certain distance from the glasses 145 since at least two of the three light sources 140, 141 are almost always visible for the two cameras 110. Consequently, the two marginal light sources 140 do not have to lie on the imaginary straight line connecting the pupils, that is those may be directly mounted on the glasses 145 before the pupils, closer to the screen, or even above or under the pupils. In such configurations, the three light sources 140, 141 mounted on the glasses 145 determine the location, i.e. the position and the orientation, of the glasses 145 unambiguously, therefore the actual location of the pupils can be computed from the location and the shape of the glasses 145.

Figure 5:
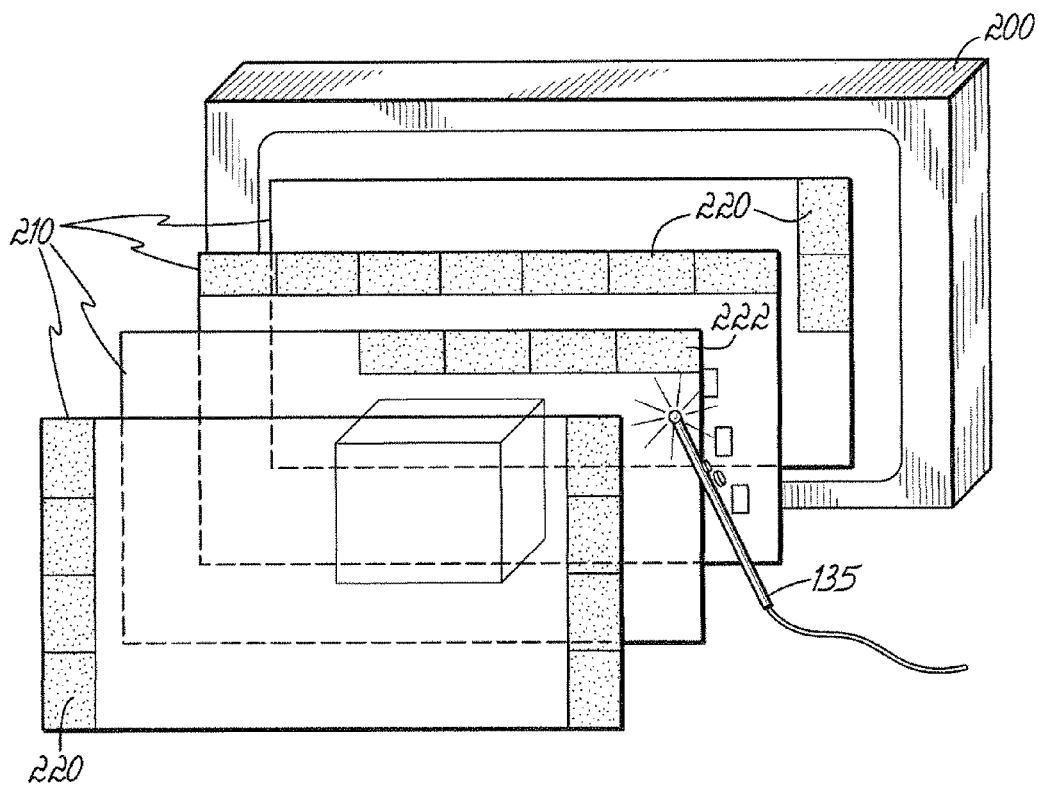
FIG. 5 illustrates a virtual three dimensional image with activable fields displayed by the system and a positioning means in the form of a stick, said stick just marking an activable field, according to an embodiment of the present invention.

If the virtual three dimensional space and the real three dimensional space are coincident in the virtual 3D manipulation system according to the invention, it will be possible to select the desired operation through the visualizing system. In order to implement such a system, the image visualized by the visualizing system should contain activable fields, each having a predetermined function. As the visualizing system is capable of visualizing three dimensional images, the operation to be performed may be selected by marking (e.g. approaching, touching, intersecting, etc.) a point-like, a two dimensional or a three dimensional field in the visualized virtual space. Accordingly, the system for selecting an operation through the visualizing system comprises a system for visualizing images having activable fields with predetermined functions and a position tracking system comprising a positioning device 135 provided with at least one light source, a plurality of image sensors for detecting the light signals emitted by the at least one light source of the positioning device 135, and a processing device $W_1$. (shown in FIG. 1) for determining the real space position of the positioning device 135 relative to the image sensors based on the signals generated by the image sensors and the position of the image sensors relative to each other. The system for selecting an operation further comprises a processing device $W_5$ (shown in FIG. 1) for activating the field associated with the marked position in the image visualized by the visualizing system, wherein the term "activating a field" stands for performing the operation assigned to that field. The processing devices $W_1$ and $W_5$ are preferably computer programs running on the same processor. By means of the above introduced system, a spatial "touch screen" can be created that, by utilizing a 3D visualizing system, allows to define one or more plain or space segment in the virtual three dimensional space, each of them having one or more point-like and/or two dimensional and/or three dimensional activable field, each field having a predetermined function assigned to it. For example, FIG. 5 illustrates a three dimensional touch screen 200 displaying several user interfaces 210 in the form of planes in the virtual three dimensional space, wherein the user interfaces 210 comprise activable fields 220 at their periphery (filled with light grey in FIG. 5). The marked field 222 associated with the selected operation or function (filled with dark grey in FIG. 5) can be activated by approaching or touching it in the virtual three dimensional space with the positioning device 135.

When the visualizing system is adapted to display identical 2D images for the two eyes and the processing device $W_5$ is adapted to activate a field only when the positioning device 135 is in a position proximate to the screen, the selection system may be used as a conventional 2D touch screen without the need of making the screen itself sensible to physical touch. Such a substantially planar touch screen requires a simple hardware configuration consisting of a conventional display device, two simple low-cost web-cameras and a positioning device 135 preferably in the form of a stick with a light source. In such a configuration there is no need of 3D glasses.

In a preferred embodiment of the 2D touch screen, the processing device $W_5$ also monitors the distance between the positioning device 135 and the screen. If the positioning device 135 gets closer than a predetermined distance to the screen, the cursor on the screen will jump to the activable field corresponding to the position of the positioning device 135. Furthermore, if the positioning device 135 approaches the screen even closer than the above mentioned predetermined distance, the processing device $W_5$ will activate the respective field and perform the operation assigned to that field. In an alternative embodiment of the 2D touch screen, additional activable fields may be defined in the space outside the screen. For example, by moving the positioning device 135 above and/or to the right side of the screen, one could exit an application, e.g. the Windows, whereas by moving the positioning device 135 under and/or to the left side of the screen, one could invoke a menu for setting the 2D touch screen.

The above introduced virtual 3D touch screen (or 2D touch screen in a special case) allows marking of the activable filed of the displayed image by the positioning device 135 not only in the place or in the close environment of displaying but also in a remote place. It is obvious that in such a situation, the real three dimensional space used for position tracking and the place of visualizing the 3D or 2D images are physically asunder. For remotely activating the activable fields of an image, the positioning device 135 comprises a plurality of light sources, preferably four light sources, for the sake of reliable image sensing. The processing device $W_1$ computes both the real space position and the real space orientation of the positioning device 135 relative to the image sensors, and the processing device $W_5$ activates the field of the image corresponding to that position and orientation. Such remote marking makes it possible, for example, to handle an image projected for the audience of a presentation from afar, or to handle an image displayed in a remote place via the Internet. It should be noted, that in case of remote marking, it is inevitably necessary to calibrate the visualizing system, during which selected reference points of the visualizing system are to be assigned to respective reference points of the space used for position tracking.

The virtual 3D manipulating system according to the invention is particularly advantageous due to the fact that it can be used practically in all fields where operations in the virtual space are needed or preferred, for example in the art, the science, the education, the entertainment, etc., as well as at designing, further shaping or turning around objects. In the virtual three dimensional space, any kind of planar or spatial surface can be freely shaped, the virtual material of a surface can be selected, wherein the material may include wood, stone, plasticine, clay, metal, etc. and even during the shaping process, the virtual material may be changed. Another advantage of the system according to the invention is the remarkable low cost and the easy way of its implementation and operation. The virtual 3D manipulation system according to the invention allows, for example, animation of shapes, measurement of shapes, performing tests, etc. Furthermore, a creative work may immediately start with spatially creating the desired shape without the need of preparing a planar plan and then transforming it into three dimensions. Thus the creative work requires substantially less time and cost. In general, the system according to the invention is advantageous in all fields where performing operations in the virtual space is beneficial.

It is particularly advantageous to use the virtual 3D manipulation system according to the invention together with a real 3D manipulation system like a robotic arm, an automatic apparatus, a machine tool, etc. used in a technological process, or a surgical manipulator. In these applications, an operation to be performed in the real space may be first performed in the virtual space, and if the result in the virtual space is satisfying, the actuator of the real 3D manipulation system may be instructed to perform the operation in the reality. For example, if a work-piece is to be turned to have an optimal shape, several three dimensional shapes may be prepared and tested by a simulator program in the virtual space, and when found the optimal shape, the real work-piece with the optimal shape may be immediately manufactured by a turning-machine upon sending the corresponding instructions to it.

The system for selecting an operation through a visualization system, according to the present invention, is particularly advantageous because it comprises exceptionally low-cost devices and allows to avoid the use of expensive touch-sensitive screens. Moreover, it allows to mark a field with a function even in the virtual three dimensional space. Another advantage of this system is that the place of displaying can be far from the place of position tracking and the activable fields of the remote image can be activated via the Internet as well.

I claim:

1. A system for performing an operation in a virtual three dimensional space, the system comprising:
   a visualizing system for visualizing the virtual three dimensional space;
   a 3D position tracking system for marking, in a real three dimensional space segment, a position of the operation to be performed in the virtual three dimensional space, said 3D position tracking system comprising a positioning device provided with at least one first signal source, at least two first image sensors for detecting signals emitted by the at least one first signal source of the positioning device and a first processor for determining the real space position of the positioning device relative to the first image sensors, based on the signals generated by the first image sensors and a spatial location of the first image sensors relative to each other, and
   a processor for mapping the real space position of the positioning device into the virtual three dimensional space and performing an operation in the mapped position,
   characterized in that the visualizing system for visualizing the virtual three dimensional space comprises:
   a device for reproducing three dimensional images, the device including a display and reproducing different images for left and right eyes of a user, and a corresponding pair of glasses for image separation, the pair of glasses being spaced from the display such that the real three dimensional space segment is located between the display and the pair of glasses and such that the user directly views the real three dimensional space segment through the pair of glasses;
   at least two second signal sources arranged in a fixed location relative to the user's eyes;
   at least two second image sensors for detecting the signals emitted by the at least two second signal sources;

a second processor for determining a real space position of the user's eyes based on the signals generated by the second image sensors; and a third processor for determining a viewing point of the virtual three dimensional space based on the real space positions of the user's eyes provided by the second processor and generating for each eye an image corresponding to a coincidence of the real three dimensional space segment and the virtual three dimensional space.

2. The system according to claim 1, wherein the positioning device includes a stick with the at least one signal source arranged at one end of the stick.

3. The system according to claim 1, wherein the positioning device comprises a button for marking the position.

4. The system according to claim 1, wherein the positioning device comprises four first signal sources.

5. The system according to claim 4, wherein the first processor is adapted to determine both the real space position and a real space orientation of the positioning device (135) relative to the first image sensors.

6. The system according to claim 1, wherein the second signal sources arranged in a fixed location relative to the user's eyes are fixed to said pair of glasses.

7. The system according to claim 6, wherein two second signal sources are fixed to said pair of glasses, said signal sources lying on an imaginary straight line connecting the pupils, at the same distance from a central axis of said pair of glasses.

8. The system according to claim 6, wherein three second signal sources are fixed to said pair of glasses.

9. The system according to claim 6, wherein the system further comprises a fourth processor for mapping the position and orientation of said pair of glasses and changes thereof into an operational instruction.

10. The system according to claim 9, wherein the operational instruction is a motion to be carried out in the virtual three dimensional space.

11. The system according to claim 1, wherein the first and second signal sources are light sources emitting visible light.

12. The system according to claim 11, wherein intensity of the light sources is adjustable.

13. The system according to claim 1, wherein the first and second signal sources are light sources emitting infrared light.

14. The system according to claim 1, wherein the first and second image sensors are used by both the 3D position tracking system and the system for visualizing the virtual 3D space.

15. The system according to claim 1, wherein the first and second image sensors are cameras recording 2D images.

16. The system according to claim 15, wherein each camera comprises a light proof unit for preventing incidence of the environmental diffuse light.

17. The system according to claim 1, wherein the display is adapted to reproduce images of different color for different eyes simultaneously; and said pair of glasses is adapted to separate the different colors displayed for the left eye and the right eye of the user.

18. The system according to claim 1, wherein the display is adapted to reproduce images of different polarity for different eyes simultaneously; and said pair of glasses is adapted to separate the differently polarized images for the left eye and the right eye of the user.

19. The system according to claim 1, wherein the display is adapted to reproduce different images for different eyes alternately, at a predetermined frequency; and said pair of glasses is adapted to pass the alternating images of the display alternately for the left eye and the right eye of the user in a synchronized manner.

20. The system according to claim 1, wherein the positioning device further comprises a vibrator unit; and the system further comprises a sixth processor for putting the vibrator unit of the positioning device into operation when the positioning device gets into a predetermined position.

21. The system according to claim 1, wherein said pair of glasses further comprises a vibrator unit; and the system further comprises a seventh processor for putting the vibrator unit of said pair of glasses into operation when the pair of glasses gets into a predetermined position.

22. The system according to claim 1, wherein the at least two second image sensors are arranged in a fixed location relative to the display.

23. A method for performing an operation in a virtual three dimensional space comprising:

visualizing a virtual three dimensional space;

marking, by positioning in a real three dimensional space segment, a position of an operation to be performed in the virtual three dimensional space, wherein the positioning comprises the steps of moving at least one first signal source fixed to a positioning device into the selected position of the real three dimensional space segment, detecting signals emitted by the at least one first signal source being in the selected position by using at least two first image sensors, and determining the position of the positioning device relative to the first image sensors, based on signals generated by the first image sensors and a spatial location of the first image sensors relative to each other;

mapping the position of the real three dimensional space segment into a position of the virtual three dimensional space; and performing the operation in the virtual three dimensional space at the mapped position;

characterized in that the virtual three dimensional space is visualized by a visualizing system which comprises:

a device for reproducing three dimensional images, the device including a display reproducing different images for left and right eyes of a user, and a corresponding pair of glasses for image separation, the pair of glasses being spaced from the display such that the real three dimensional space segment is located between the display and the pair of glasses and such that the user directly views the real three dimensional space segment through the pair of glasses;

at least two second signal sources arranged in a fixed location relative to the user's eyes;

at least two second image sensors for detecting the signals emitted by the at least two second signal sources;

a second processor for determining real space positions of the user's eyes based on the signals generated by the second image sensors; and a third processor for determining a viewing point of the virtual three dimensional space based on the real space positions of the user's eyes provided by the second processor and producing for each eye an image corresponding to a coincidence of the real three dimensional space segment and the virtual three dimensional space.

24. The method according to claim 23, wherein a light source emitting visible light is used as the first and second signal sources.

25. The method according to claim 23, wherein a light source emitting infrared light is used as the first and second signal sources.

26. The method according to claim 23, wherein cameras recording 2D images are used as the first and second image sensors.

27. The method according to claim 23, wherein the positioning device is provided with at least two first signal sources and both the real space position and an orientation of the positioning device relative to the first image sensors are determined.

28. The method according to claim 27, wherein a positioning device provided with three first signal sources is used.

29. The method according to claim 23, wherein the first and second image sensors are used both for visualizing the virtual three dimensional space and for positioning.

30. The method according to claim 23, wherein the step of positioning comprises marking a point-like location in the real three dimensional space segment.

31. The method according to claim 23, wherein the step of positioning comprises marking a continuous section in the real three dimensional space segment.

32. The method according to claim 23, wherein the at least two second image sensors are arranged in a fixed location relative to the display.

33. A system for selecting, through a visualizing system, an operation to be performed, the system comprising
 a position tracking system; and
 a visualizing system for visualizing a virtual three dimensional space having activable fields, wherein a predetermined function is associated with each activable field, and
 wherein the position tracking system comprises:
 a positioning device provided with at least one first signal source;
 at least two first image sensors for detecting a signal emitted by the at least one first signal source of the positioning device; and
 a first processor for determining a real space position of the positioning device relative to the first image sensors, based on signals generated by the first image sensors and a spatial location of the first image sensors relative to each other;
 characterized in that the system further comprises a fifth processor for activating a field in the virtual three dimensional space visualized by the visualizing system, said field being associated with the selected position, and
 wherein the visualizing system for visualizing the virtual three dimensional space comprises:
 a device for reproducing three dimensional images, the device including a display reproducing different images for left and right eyes of a user, and a corresponding pair of glasses for image separation, the pair of glasses being spaced from the display such that the real three dimensional space segment is located between the display and the pair of glasses and such that the user directly views the real three dimensional space segment through the pair of glasses;
 at least two second signal sources arranged in a fixed location relative to the user's eyes;
 at least two second image sensors for detecting the signals emitted by the at least two second signal sources;
 a second processor for determining real space positions of the user's eyes based on the signals generated by the second image sensors; and
 a third processor for determining a viewing point of the virtual three dimensional space based on the real space positions of the user's eyes provided by the second processor and producing for each eye an image corresponding to a coincidence of the real three dimensional space segment and the virtual three dimensional space.

34. The system according to claim 33, wherein the virtual three dimensional space contains point-like and two dimensional and three dimensional activable fields.

35. The system according to claim 33, wherein the positioning device is provided with four first signal sources; the first processor is adapted to determine both of the real space position and an orientation of the first signal sources relative to the first image sensors, said first signal sources being fixed to the positioning device; and
 the fifth processor is adapted to activate the field associated with the position and orientation.

36. The system according to claim 33, wherein the at least two second image sensors are arranged in a fixed location relative to the display.

* * * * *